(12) United States Patent
Meyer

(10) Patent No.: US 7,448,458 B2
(45) Date of Patent: Nov. 11, 2008

(54) ELECTRIC VEHICLE REACTION DRIVE

(76) Inventor: John Fred Meyer, 2654 Tampa Dr., Walled Lake, MI (US) 48390

( * ) Notice: Subject to any disclaimer, the term of this patent is extended or adjusted under 35 U.S.C. 154(b) by 367 days.

(21) Appl. No.: 11/242,746

(22) Filed: Oct. 4, 2005

(65) Prior Publication Data

US 2007/0074918 A1   Apr. 5, 2007

(51) Int. Cl.
B60K 1/02 (2006.01)
(52) U.S. Cl. .................. 180/65.3; 180/65.6; 701/22; 903/909; 903/942; 903/943
(58) Field of Classification Search .............. 180/65.1, 180/65.2, 65.3, 65.4, 65.6; 701/22; 903/902, 903/903, 909, 925, 942, 943
See application file for complete search history.

(56) References Cited

U.S. PATENT DOCUMENTS

| | | | |
|---|---|---|---|
| 5,428,274 A | | 6/1995 | Furutani et al. |
| 5,635,805 A | | 6/1997 | Ibaraki et al. |
| 5,722,502 A | | 3/1998 | Kubo |
| 5,841,201 A | | 11/1998 | Tabata et al. |
| 5,846,155 A | * | 12/1998 | Taniguchi et al. ............. 477/2 |
| 5,875,691 A | | 3/1999 | Hata et al. |
| 5,927,417 A | * | 7/1999 | Brunner et al. ............ 180/65.6 |
| 5,934,395 A | | 8/1999 | Koide et al. |
| 5,984,034 A | | 11/1999 | Morisawa et al. |
| 6,048,289 A | * | 4/2000 | Hattori et al. .................. 477/15 |
| 6,059,064 A | | 5/2000 | Nagano et al. |
| 6,098,733 A | | 8/2000 | Ibaraki et al. |
| 6,119,799 A | | 9/2000 | Morisawa et al. |
| 6,155,364 A | | 12/2000 | Nagano et al. |
| 6,306,057 B1 | | 10/2001 | Morisawa et al. |

(Continued)

FOREIGN PATENT DOCUMENTS

DE   20 12 384 A1   10/1970
WO   WO 03/016750 A   2/2003

OTHER PUBLICATIONS

Walterman P: "Modelling and control of the logitudinal and lateral dynamics of a series hybrid vehicle" Control Applications, 1996., Proceedings of the 1996 IEEE International Conference on Dearborn, MI, USA, Sep. 15-18, 1996, New York, NY, USA, IEEE, US, Sep. 15,1996, pp. 191-198, XP01099572 ISBN: 0-7803-2975-9.

Toyota, Hybrid Synergy Drive, Toyota Hybrid System THS II, May 2003, pp. 1-21, Toyota Motor Corporation, Public Affairs Division, Tokyo, Japan.

Primary Examiner—Christopher Ellis
Assistant Examiner—John D Walters
(74) Attorney, Agent, or Firm—Young Basile

(57) ABSTRACT

An electric drive for a vehicle or other machine having a rotatable drive mechanism, in which the torque output of an electric motor is coupled to drive a main generator through a planetary gear set, the electrical output of the main generator is supplied to the motor to drive the motor, and a reaction torque produced in the planetary gear set from the driving of the generator is coupled to drive the vehicle wheels or other motion means. The reaction torque produced in the planetary gear set in response to the generator torque is greater than the electric motor torque input. Start-up and make-up power for the electric motor are provided by an onboard battery recharged by an auxiliary onboard generator, or by the auxiliary onboard generator.

20 Claims, 11 Drawing Sheets

U.S. PATENT DOCUMENTS

| | | |
|---|---|---|
| 6,334,498 B1 | 1/2002 | Morisawa et al. |
| 6,340,339 B1 | 1/2002 | Tabata et al. |
| 6,344,008 B1 | 2/2002 | Nagano et al. |
| 6,442,455 B1 * | 8/2002 | Kotre et al. .................... 701/22 |
| 6,476,571 B1 | 11/2002 | Sasaki |
| 6,540,035 B2 | 4/2003 | Nagano et al. |
| 6,563,230 B2 | 5/2003 | Nada |
| 6,565,480 B2 | 5/2003 | Endo et al. |
| 6,619,151 B2 | 9/2003 | Shioiri |
| 6,637,530 B1 | 10/2003 | Endo et al. |
| 6,655,485 B1 | 12/2003 | Ito et al. |
| 6,656,082 B1 | 12/2003 | Yamada et al. |
| 6,896,080 B2 * | 5/2005 | Takenaka .................... 180/65.2 |
| 7,057,304 B2 * | 6/2006 | Ueda ........................ 290/40 C |
| 7,164,247 B2 * | 1/2007 | Joe et al. .................... 318/432 |
| 7,306,064 B2 * | 12/2007 | Imazu et al. ............... 180/65.2 |
| 2007/0256871 A1 * | 11/2007 | Kaneko et al. ............. 180/65.2 |

* cited by examiner

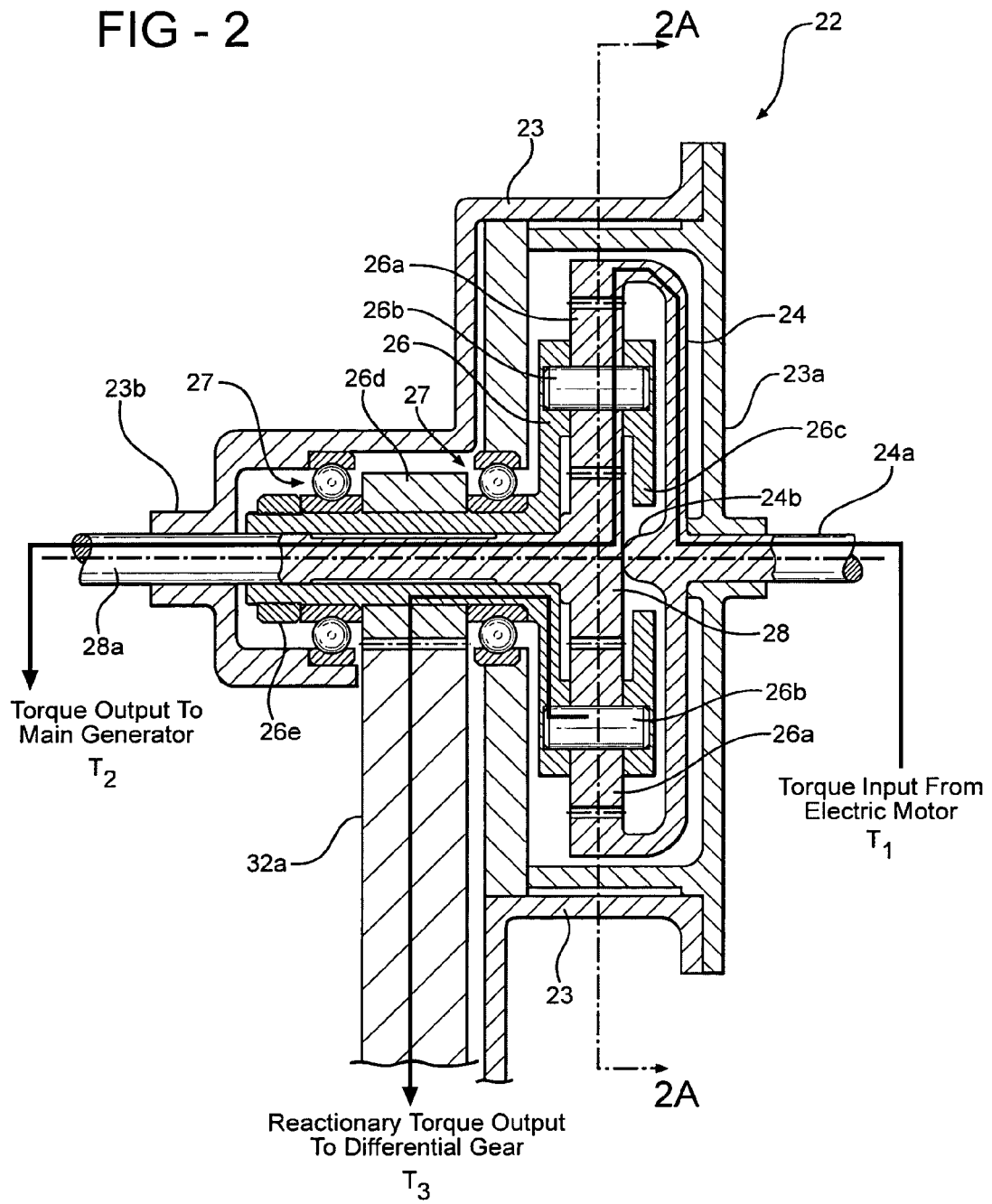

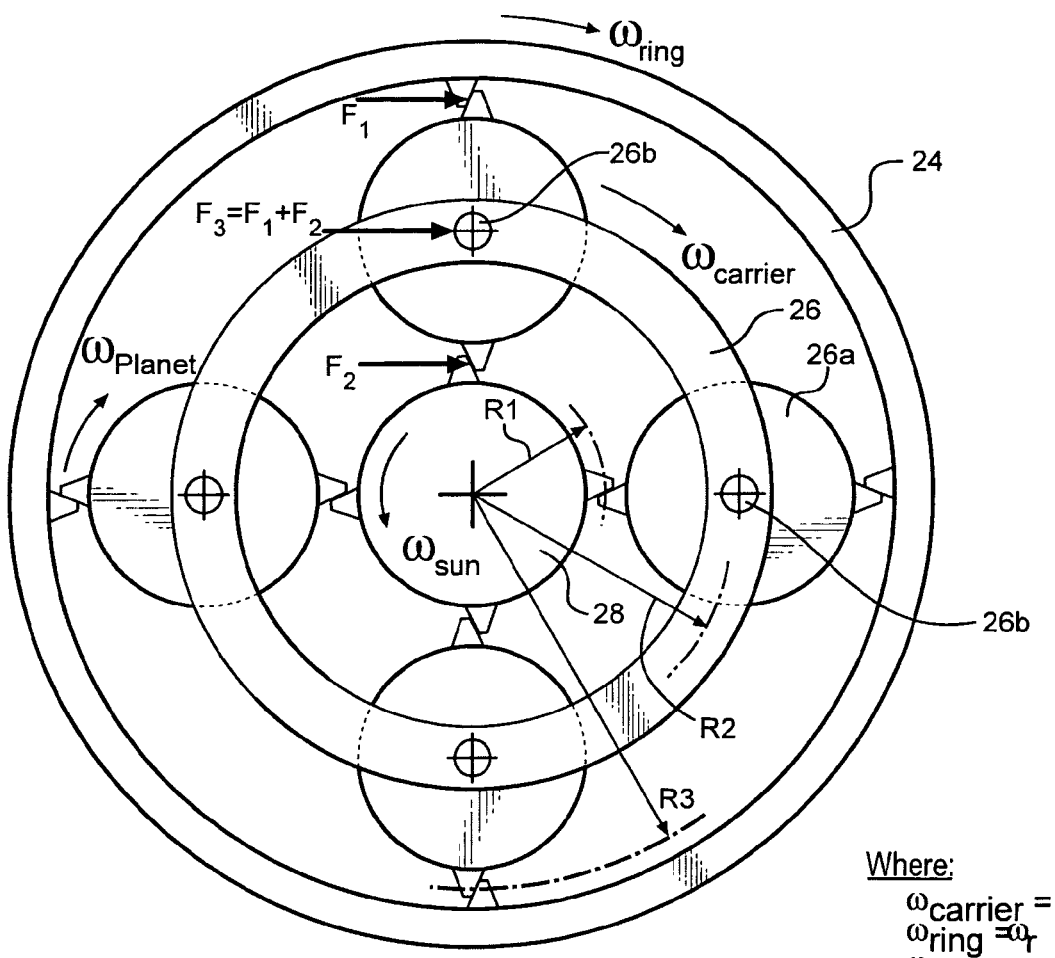

FIG - 3

Assume:
T1=Input Torque= 125 Ft-Lbs
R1=1" (Radius of Sun Gear)
R2=2" (Radius of Carrier Ring)
R3=3" (Radius of Ring Gear)

Then:

$F_1 = T_1 * (12"\text{per ft.}/3") = 500$ Lbs
$F_2 = F_1 = 500$ Lbs
$F_3 = F_1 + F_2 = 1000$ Lbs
$T_3 = F_3 * (2"/12"\text{per ft.}) = 166.7$ Ft - Lbs
$T_3$ = Torque on Carrier Ring Assembly Where:
$\omega_{carrier} = \omega_c$
$\omega_{ring} = \omega_r$
$\omega_{planet} = \omega_p$
$\omega_{sun} = \omega_s$ And:
$\omega_r = 1.33\omega_c$
$\omega_r = -0.33\omega_s$
$\omega_r = 0.33\omega_p$

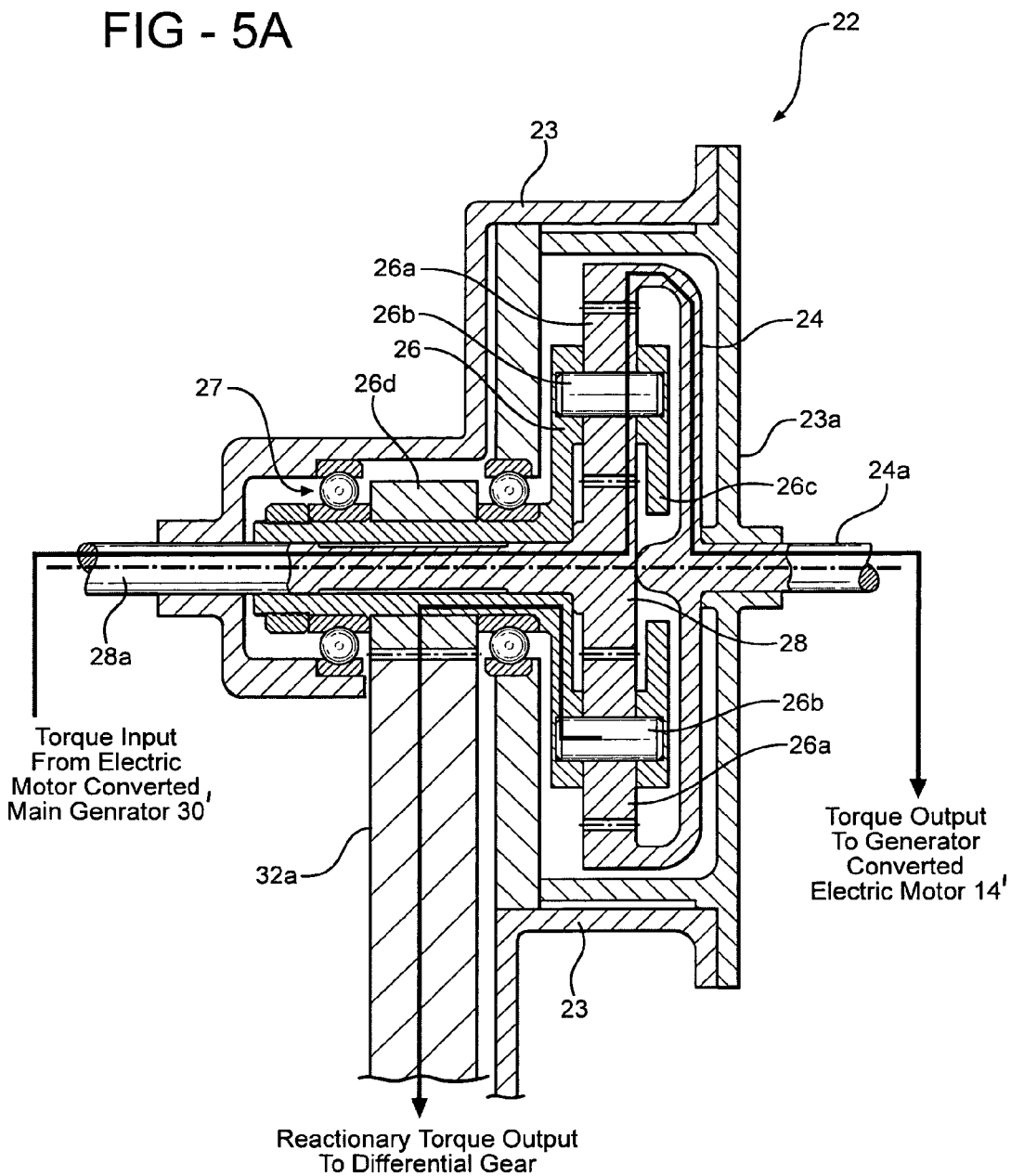

ELECTRIC VEHICLE REACTION DRIVE

FIELD OF THE INVENTION

The present invention is in the field of electric and hybrid-electric vehicle drives that provide power in various ways to drive a wheeled vehicle.

DESCRIPTION OF THE RELATED ART

Electric vehicles that are driven entirely by an electric motor are relatively slow, low-powered vehicles that typically require large battery banks for even a limited driving range.

Hybrid vehicles that use combustion engines to power and supplement an electric drive motor are currently more practical and are becoming more popular for ordinary passenger vehicles. The typical hybrid drive uses all of the torque output from an electric motor to drive the vehicle's wheels, while a combustion engine adds drive torque to the wheels when the electric motor is not enough, and runs a generator to supply the electricity for the electric motor. These hybrid systems do not generate current unless the combustion engine is operating, and the drive torque from the electric motor is relatively low, so the combustion engine must run much of the time. Hybrid vehicles accordingly require fairly large combustion engines and fuel tanks, a clutch to couple and decouple the combustion engine output to and from the drive wheels relative to the motor at different torque levels, and relatively large batteries to store electric motor power for the times when the combustion engine is not running the generator.

SUMMARY OF THE INVENTION

The invention is an electric vehicle drive in which the electric motor supplies all of the driving force needed by the vehicle wheels through a reactive generator mechanism, resulting in greater vehicle drive torque than typical electric drives. All of the force generated by the electric motor torque output is used to drive a main generator through a planetary gear. The electrical output of the main generator is used to power the electric motor, and the reaction force output of the main generator through the planetary gear is used to drive the vehicle drive wheels. Since the electric motor requires startup power as well as more running power than it receives back from the main generator, additional electrical power needed by the motor is supplied by a battery and/or by an auxiliary onboard generator. In the preferred form, the auxiliary onboard generator (AOG) is powered by a generator-dedicated combustion engine that is small and efficient.

The electric motor is initially started by the battery and/or the AOG to begin driving the main generator. The current produced by the main generator is fully used by the electric motor and/or the batteries at any given generator speed, such that the generator is under a maximum load draw at all times. The reaction force output of the main generator developed through the planetary gear is greater than the action force output of the electric motor, allowing the wheels to be driven entirely by the reactive force from the main generator at all speeds and under all driving conditions. The vehicle therefore does not require a clutch.

Vehicle reverse motion is achieved by operating the main generator as an electric motor and the electric motor as a generator, with each continuing to operate in the same rotational direction as for forward vehicle motion. When the operating modes of the main generator and electric motor are reversed while the vehicle is moving forward, the reaction force is reversed and acts as a brake through the planetary gear to help bring the vehicle to a stop before reversing wheel direction. While this is not intended as the primary method of braking the vehicle, it does provide a secondary braking mode in the event of primary braking mode failure. This method of drive wheel torque reversal never reaches a level at which the wheels would immediately spin in the opposite direction or the vehicle would abruptly stop, and makes it easier and more efficient to rock the vehicle back and forth when stuck. In the primary method of vehicle braking, some of the vehicle's kinetic energy can be converted into electrical energy (regenerative braking). In this primary regenerative braking mode, conventional brakes slow the vehicle, and the electric motor is converted to operate as a generator with the kinetic energy of the vehicle providing the torque to drive both the main generator, and the generator converted electric motor. The electrical current produced from the two generators (via the vehicles kinetic energy) can either be used by the vehicle's electrical system, stored in the batteries, or both.

The generator-reactive wheel driving torque produced by the present drive system is believed to be equal to or greater than that of existing electric and hybrid vehicle drive systems, with the advantages of a smaller and more efficient onboard combustion engine, a simpler drive connection to the wheels, reduced battery storage requirements, and lighter weight.

The electric drive of the present invention may also be applicable to drive rotary machinery other than vehicle wheels.

These and other features and advantages of the invention will be apparent after reading the following specification in light of the accompanying drawings.

BRIEF DESCRIPTION OF THE DRAWINGS

The description herein makes reference to the accompanying drawings wherein like referenced numerals refer to like parts throughout several views and wherein:

FIG. 2 is a side section view of the planetary gearing of FIG. 1 and its coupling to the electric motor, the generator, and the drive wheel differential gear, with the flow paths of electric motor torque and generator-induced reaction torque shown by arrows.

FIG. 3 is a schematic plan view of the gear interfaces between the ring gear, the planetary gears, and the sun gear of FIG. 1 diagramming the forces in this part of the system.

FIG. 5A is similar to FIG. 2, but shows the reversed reaction torque through the planetary gearing during reverse vehicle motion (or secondary vehicle braking mode).

DETAILED DESCRIPTION OF THE INVENTION

Figure 1:
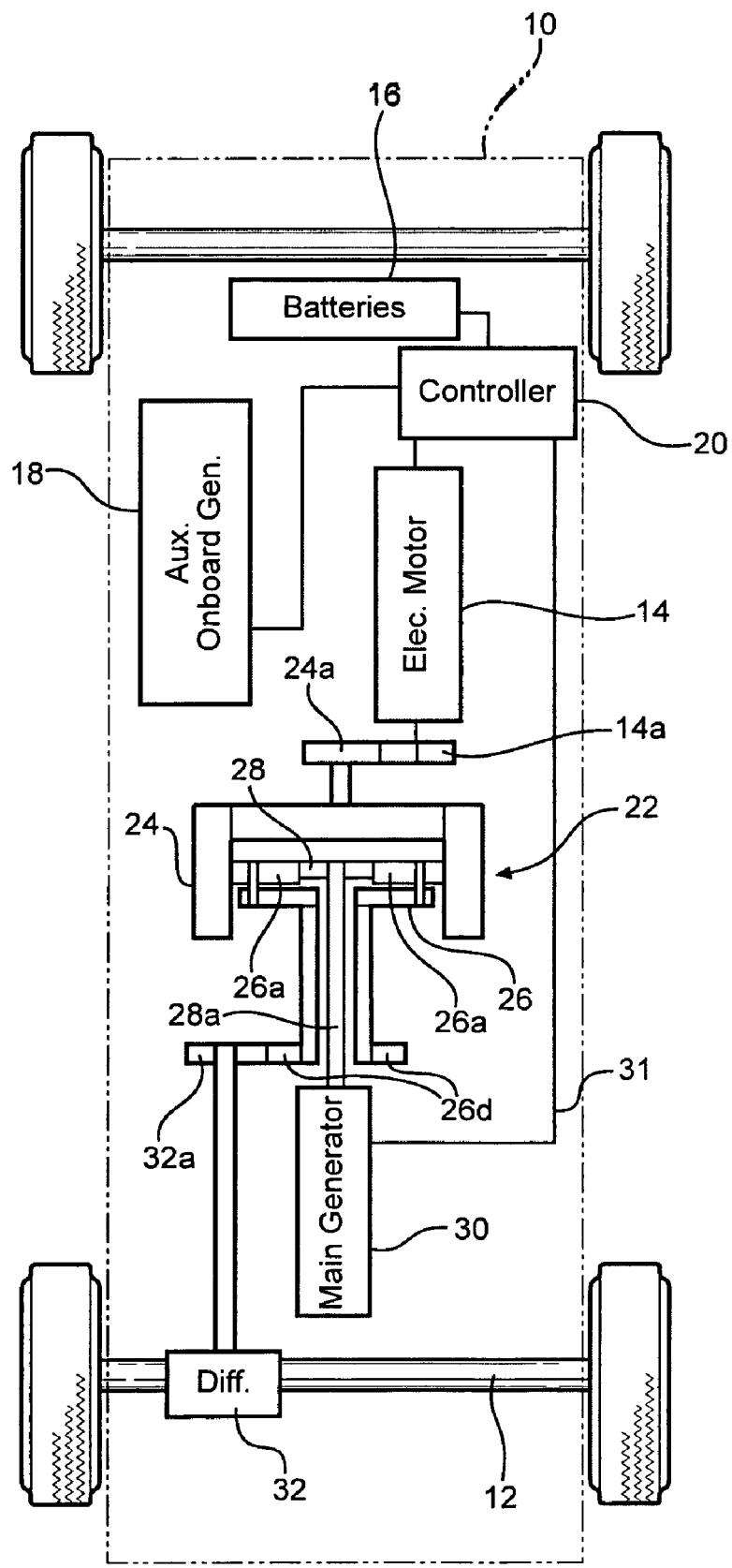
FIG. 1 is a schematic illustration of an electric vehicle drive according to the invention.

Referring first to FIG. 1, the electric reaction drive of the invention is shown in schematic form incorporated into a typical wheeled passenger vehicle 10 having a standard set of front drive wheels 12. In the illustrated embodiment, an electric motor 14 is initially supplied with electric current from batteries 16 and/or an auxiliary onboard generator 18 through a microprocessor or computer type controller 20 that also controls motor function. The torque output of electric motor 14 is connected to drive a planetary gear set 22, with a shaft and/or gear connection 14a to a corresponding shaft and/or gear 24a coupled to rotate the outer ring gear portion 24 of the planetary gear. Ring gear 24 meshes with and rotates planetary gears 26a which are rotatably mounted on the carrier ring assembly 26. Planetary gears 26a mesh with and simultaneously rotate central sun gear 28 coupled via shaft 28a to turn main generator 30. At the same time a drive gear 26d, which is coupled to the carrier ring assembly 26, is rotated via the reactionary torque in the system to drive the front wheel set 12 through a meshing gear connection 32a to differential 32.

Main generator 30 produces electrical current in a known manner as it is rotated by electric motor 14 through planetary gearing 22. The generator current is fed back to drive the motor 14 through a suitable current path such as conventional wiring 31 and controller 20.

Since there are energy losses in the paths of the torque supplied to generator 30 by motor 14 and the electrical power delivered from generator 30 back to motor 14, since the generator does not generate electrical current until the motor 14 begins running, and since other vehicle electrical systems may require electrical power in addition to that supplied by generator 30, motor 14 needs both start-up electrical power and make-up electrical power from another source on board the vehicle 10. This is supplied in the illustrated embodiment by a combination of batteries 16 and auxiliary onboard generator (AOG) 18 through controller 20. Batteries 16 are charged by AOG 18 through controller 20, and motor 14 draws current from the batteries 16 through controller 20 as needed to supplement the main generator 30. Alternately, controller 20 may allow current generated by AOG 18 to be supplied directly to motor 14 as needed in order to supplement or protect the batteries 16.

Figure 1A:
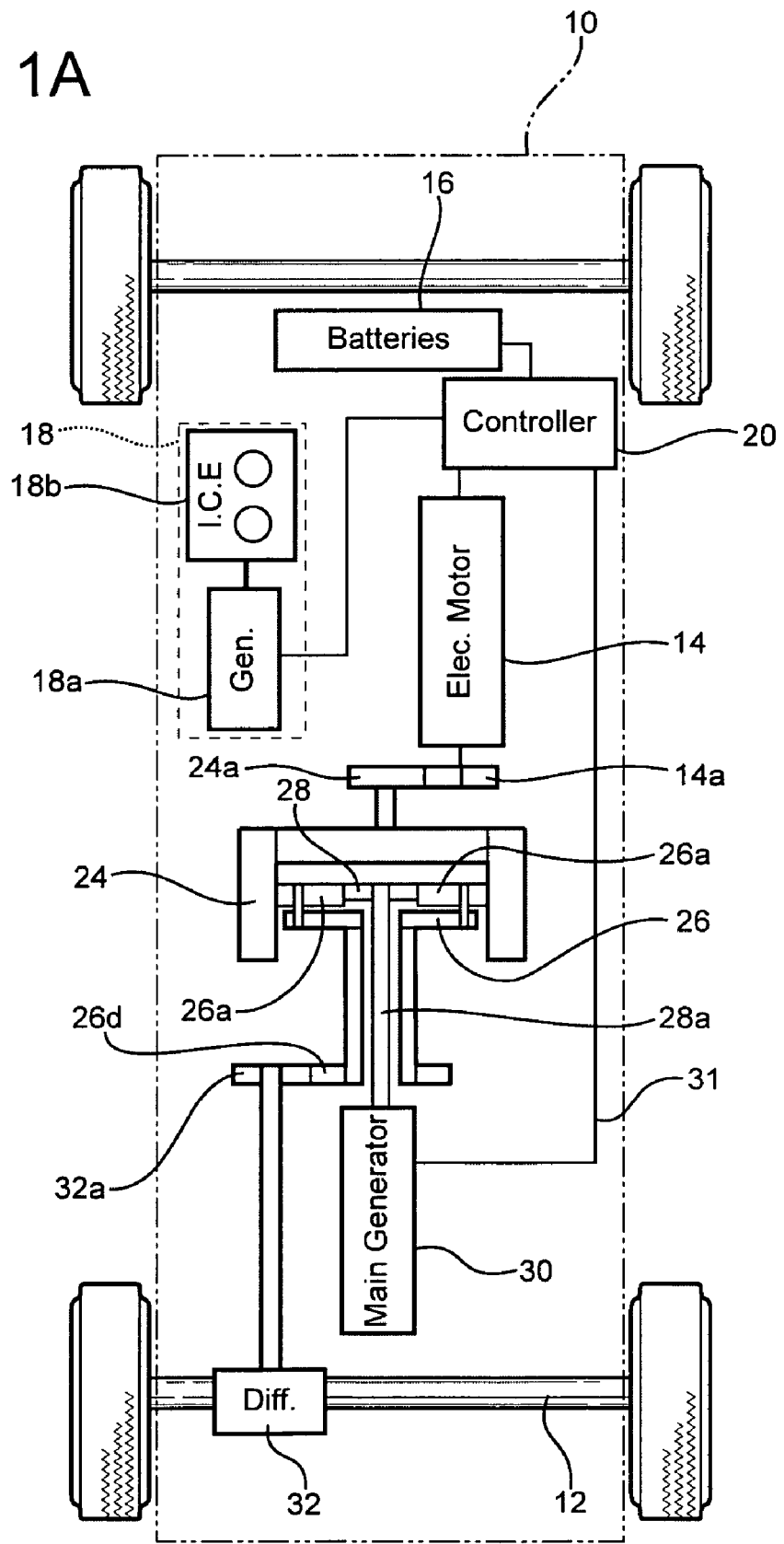
FIG. 1A is similar to FIG. 1, but shows a preferred onboard electricity generation apparatus.

Referring to FIG. 1A, AOG 18 can be any onboard electricity-generating device, including but not limited to solar panels, fuel cells, or, in the preferred embodiment illustrated, and auxiliary generator 18a run by a generator-dedicated combustion engine 18b burning known fuels such as gasoline, ethanol, methanol, diesel, biodiesel, or propane. Because combustion engine 18b is dedicated to running auxiliary generator 18a for the sole purpose of recharging batteries 16, the engine can be smaller, lighter, quieter, simpler, and more fuel efficient than a typical automotive internal combustion engine used to drive the vehicle wheels 12. Small combustion engines similar to those used in lawnmowers and portable generators are possible options. AOG 18 also reduces the capacity requirements for onboard storage batteries 16, further reducing weight and cost. The AOG 18 can also be used to provide auxiliary power to other off-board devices such as might be required on construction sites, or residential homes in the event of electrical power loss. It will be understood that while AOG 18 will generally make any off-board charging capability unnecessary, an off-board battery charging system of known type can be provided in conjunction with the AOG 18.

Figure 2A:
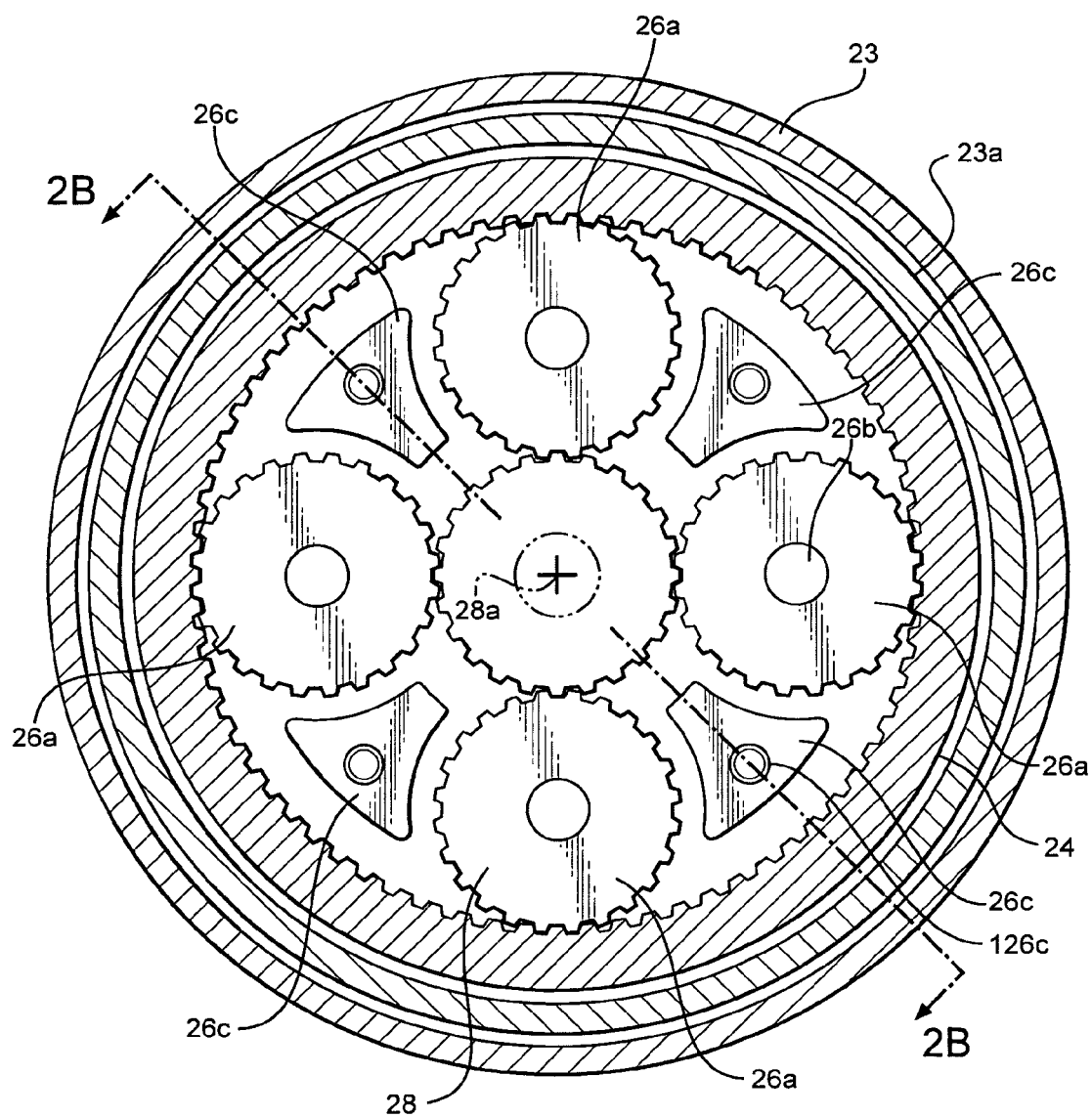
FIG. 2A is a plan section view of the planetary gear set, taken through line 2-A in FIG. 2.
Figure 4:
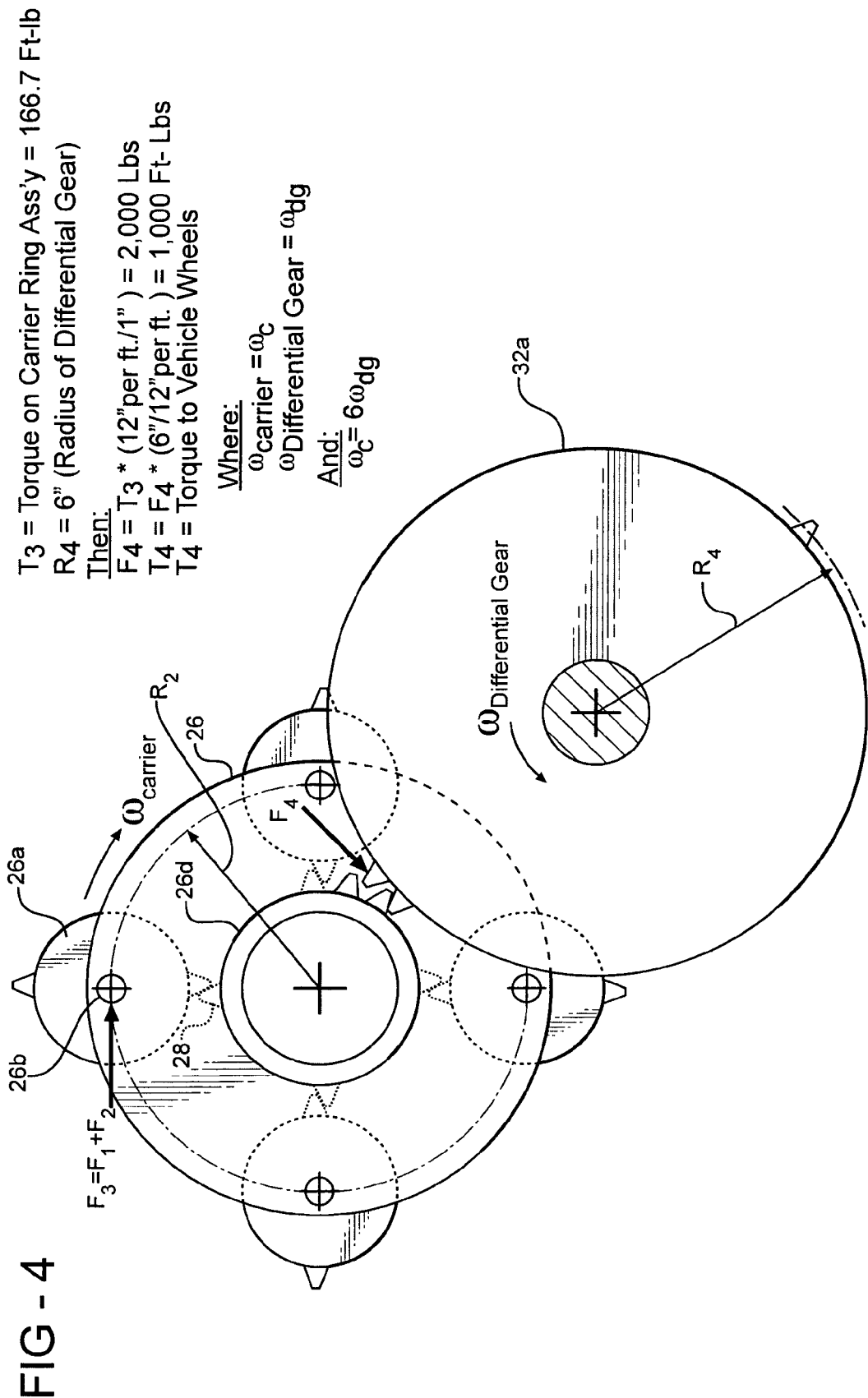
FIG. 4 is a schematic plan view of the gear interface between the planetary gear's carrier output or drive gear and the vehicle wheel differential gear, diagramming the forces in this part of the system.

FIGS. 2-4 illustrate the details of the planetary assembly 22 and the manner in which it delivers a generator-reactive output torque to the drive differential greater than the motor input torque. While FIGS. 2-4 illustrate a simple planetary gear system with a single carrier, sun gear, and ring gear, more complex planetary gear arrangements, for example with more than one of each gear type or set, could also be used to provide additional gear ratios for the present drive system. It will also be understood that although direct drive connections between the electric motor 14 and planetary gearing and between the planetary gearing and the generator are shown as the preferred example, intermediate gearing, such as but not limited to a gearbox, could be installed in the drive connections between the motor 14 and planetary gear and between the planetary gear and generator.

Figure 2B:
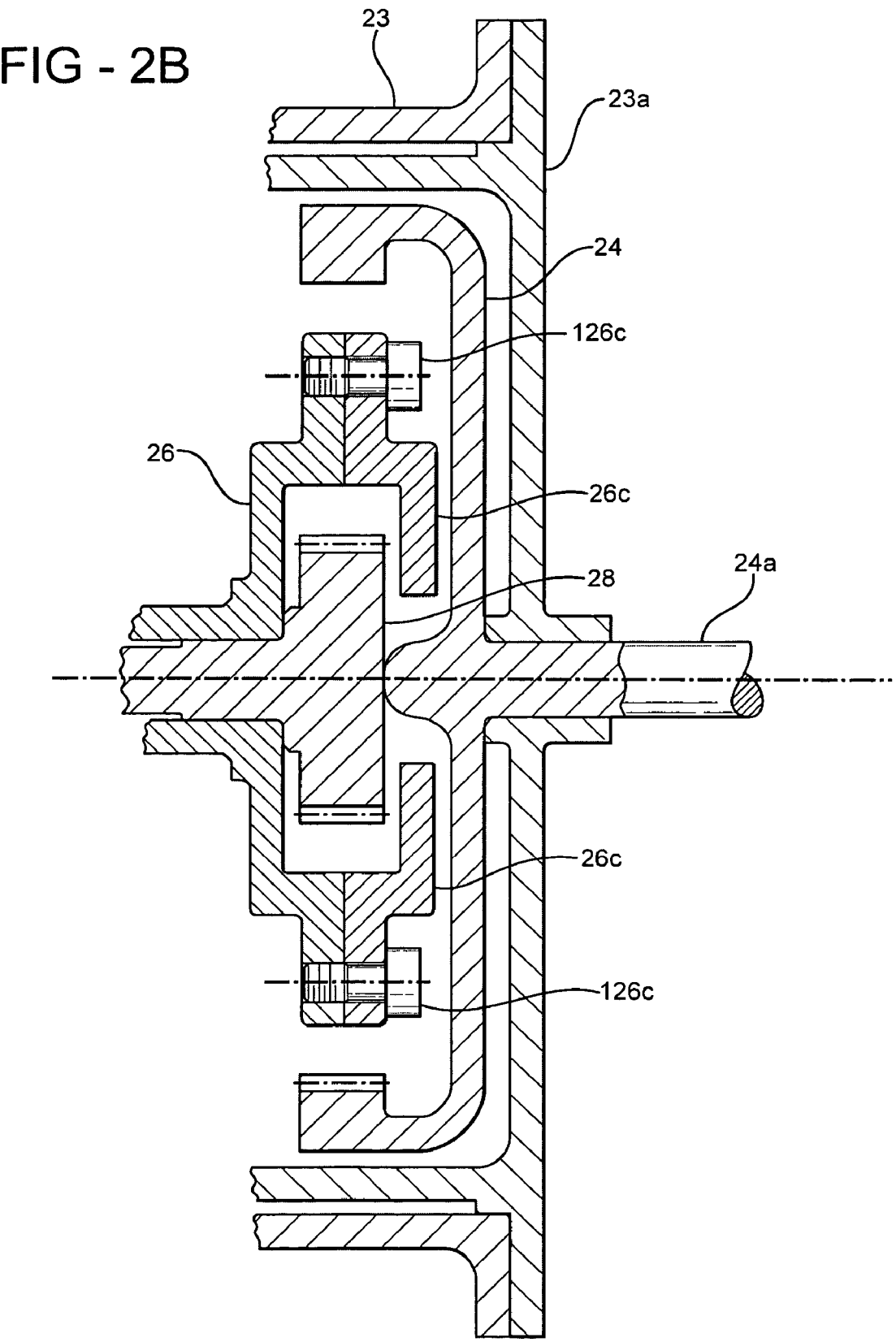
FIG. 2B is a side section view of the planetary gear set, taken through line 2-B in FIG. 2A.

FIG. 2 shows planetary assembly 22 housed in a cage or housing 23 with a cover 23a that provides a seal and bearing support for ring gear drive shaft 24a and for carrier ring assembly bearings 27. Housing 23 could also house differential gear 32a, if desired. Ring gear 24 engages planetary gears 26a, which are rotatably mounted on shafts 26b mounted between carrier ring 26 and a retaining plate 26c secured to carrier ring 26 with bolts 126c (FIG. 2B). Carrier ring 26 rotates on bearings 27 supported by the housing 23 and is secured in place between the ring gear 24 and the rearmost bearing by a retaining nut 26e. Carrier ring drive gear 26d is anchored to the carrier ring 26 between bearings 27 and meshes with differential gear 32a. Planetary gears 26a mesh with sun gear 28, which rotatingly bears against a central bearing surface 24b of ring gear 24 and whose shaft 28a passes through the carrier ring assembly 26 and out through a sealed, supportive end 23b of housing 23 to drive the main generator 30.

FIG. 2 also shows the path of motor input torque $T_1$ through ring gear 24, planetary gears 26a, and sun gear 28 to generator 30 as output torque $T_2$. Torque $T_1$ is the direct action torque put into the system by the motor 14. All of the force generated from this input torque is used to drive the generator in the opposite rotational direction (for example, if motor 14 rotates clockwise, then ring gear 24 and planetary gears 26a rotate clockwise, and sun gear 28 and main generator 30 rotate counterclockwise). The force producing the torque output $T_2$ to the generator is equal to the force generated by the electric motor input torque $T_1$. The forces generated by these motor input and generator output torques $T_1$ and $T_2$ act through the planetary shafts 26b on carrier ring assembly 26 and drive gear 26d and through the differential gear 32a to drive the vehicle wheels 12 with a reaction torque $T_3$.

Referring to FIG. 3, the forces $F_1$ and $F_2$, generated by the rotationally opposite electric motor input and main generator reaction torques $T_1$ and $T_2$, act in the same direction against the planetary gear shafts 26b on carrier ring assembly 26. $F_1$ and $F_2$ are thus additive at the carrier ring assembly 26, generating a reaction force $F_3=F_1+F_2$ acting through the radius of the planetary gears 26a on the carrier ring assembly 26 to produce a reaction torque $T_3$ in the carrier ring assembly (comprising carrier ring 26, planetary gears 26a, planetary gear shafts 26b, retaining plate 26c, and drive gear 26d) greater than the motor input torque $T_1$. Referring to FIG. 2, this reaction torque is applied through carrier drive gear 26d to differential gear 32a to drive the vehicle wheels 12.

By way of example, assuming that the motor input torque is 125 ft-lbs., that this torque is transferred to the planetary gears 26a at a pitch diameter of 6", that the radius of carrier ring 26 to planetary gear shafts 26b is 2", that the radius of carrier drive gear 26d is 1", that the radius of each planetary gear 26a is 1", that the radius of the sun gear 28 is 1", and that the radius of the differential gear 32a is 6", the following force and torque values can be calculated using known equations (see, for example, attached reference 1, the article in *Machine Design*, May 26, 1983 p. 55-58, entitled "Shortcuts for Analyzing Planetary Gearing" by R. J. Ferguson, Professor, Department of Mechanical Engineering, Royal Military College of Canada Kingston, Ontario, Canada) for the planetary assembly 22 schematically illustrated in FIGS. 3 and 4:

T1=125 ft-lbs.
F1=(T1)(12" per ft/3")=500 lbs.
F2=F1=500 lbs.
F3=F1+F2=1000 lbs.
T3=(F3)(2"/12" per ft/1")=166.7 ft-lbs.
F4=(T3)(12" per ft/1")=2000 lbs.
T4=(F4)(6"/12" per ft)=1000 ft-lbs=torque to the driving wheels FIG. 4 shows the carrier ring assembly 26 and the interface of the carrier ring drive gear 26d with the vehicle differential gear 32a. If the planetary gears 26a and the sun gear 28 both have pitch diameters of 2" as shown in FIG. 3, the reactionary force F3 acts at a 2" radius and produces a torque on the carrier ring assembly 26 of 166.7 Ft-Lbs (i.e., 1,000 Lbs×2"/12" per ft=166.7 Ft-Lbs). This torque is transferred through the carrier ring assembly 26 to the carrier ring drive gear 26d. Assuming the carrier ring gear has a pitch diameter of 2", the torque transferred to the carrier ring drive gear 26d produces a force (F4) of 2,000 Lbs (166.7 Ft-Lbs×12" per ft/1"=2,000 Lbs) on the gear teeth of the differential gear 32a. If the differential gear 32a has a pitch diameter of 12", this force (F4) produces a torque of 1,000 Ft-Lbs (2,000 Lbs×6"/12" per ft=1,000 Ft-Lbs) to drive the vehicle wheels 12.

Assuming that the maximum motor input torque is 125 ft-lbs., corresponding to a 100% accelerator position, the following table lists the various forces and torques transmitted through the system at 10% motor input torque increments:

When the vehicle 10 is moving forward, the carrier ring assembly 26 rotates in the same direction as the ring gear 24. As the vehicle speed increases or decreases, the carrier ring assembly 26 will also increase or decrease in speed. The electric motor 14 will increase or decrease in speed at the rate of 1⅓ revolutions for every revolution that the carrier ring assembly 26 increases or decreases in speed to maintain the speed and load at the main generator 30 for any given torque output of the electric motor 14. The reaction force on the carrier ring assembly 26 always depends on the load on the main generator 30. The main generator 30 must be designed to allow all the current that the generator is capable of producing at any given generator speed to be used at all times (in other words, the generator must be under max load draw at all times when the vehicle 10 is moving). As the load of the main generator 30 goes up due to more electric motor torque output being demanded via the vehicle accelerator, the reaction force acting on the carrier ring assembly 26 also increases resulting in more torque to the vehicle wheels 12, and the vehicle speed will change depending on the external loads acting on the vehicle 10.

Accordingly, vehicle speed increases if external vehicle loads remain constant, if external vehicle loads decrease, or if external vehicle loads increase at a lower rate than the increase in reactionary torque. Vehicle speed remains the same if external vehicle loads increase at the same rate as the increase in reactionary torque. Vehicle speed decreases if external vehicle loads increase at a greater rate as the increase in reactionary torque.

Figure 5:
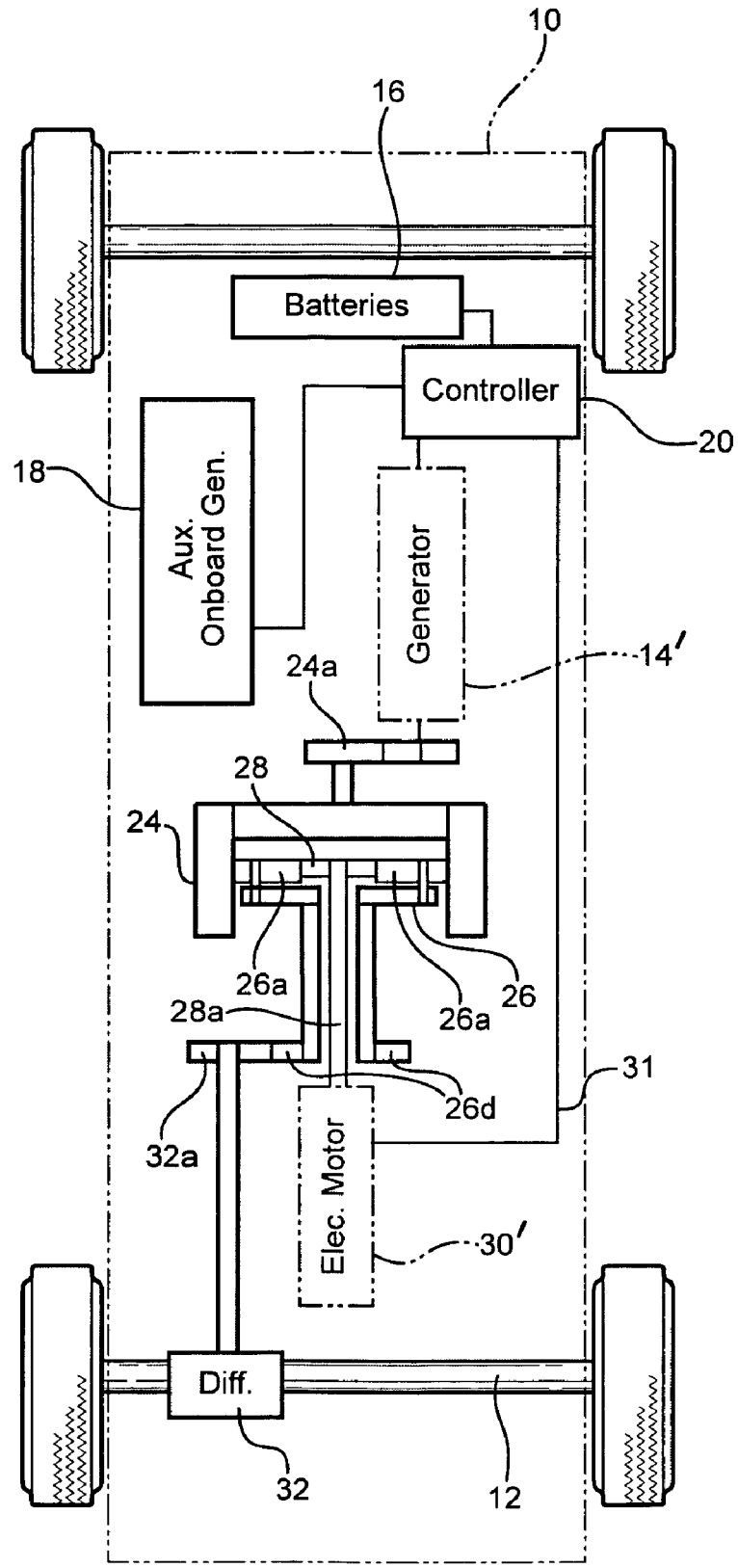
FIG. 5 is similar to FIG. 1, but shows the generator and electric motor in their reversed operating roles which is required for vehicle reverse motion (or secondary vehicle braking mode).

Referring next to FIGS. 5 and 5A, to operate vehicle 10 in reverse, the operating mode of main generator 30 is converted or switched in a known manner to run as an electric motor 30', and the operating mode of the electric motor 14 is converted or switched in a known manner to run as a generator 14', with each continuing to operate in the same rotational direction as was the case for vehicle forward motion. The reaction force acting on the carrier ring assembly 26 would now be in the opposite direction, causing carrier ring assembly 26 to rotate

| Variable | Variable Description Accelerator Position (% Depressed) | Off 0% | \multicolumn{10}{c}{Accelerator Position} | | | | | | | | | |
|---|---|---|---|---|---|---|---|---|---|---|---|---|
| | | | 10% | 20% | 30% | 40% | 50% | 60% | 70% | 80% | 90% | 100% |
| $T_1 =$ | Electric Motor Input Torque (Ft-lbs) | 0 | 12.5 | 25 | 37.5 | 50 | 62.5 | 75 | 87.5 | 100 | 112.5 | 125 |
| $F_1 =$ | Force exerted by electric motor input torque on Planet Gear teeth (lbs) | 0 | 50 | 100 | 150 | 200 | 250 | 300 | 350 | 400 | 450 | 500 |
| $F_2 =$ | Force exerted by Generator Load on Planet Gear teeth (lbs) | 0 | 50 | 100 | 150 | 200 | 250 | 300 | 350 | 400 | 450 | 500 |
| $F_3 =$ | Reactionary Force exerted on Carrier Ring Assembly (lbs) | 0 | 100 | 200 | 300 | 400 | 500 | 600 | 700 | 800 | 900 | 1000 |
| $T_3 = T_4 =$ | Reaction Torque transferred to Carrier Ass'y Drive Gear (Ft-lbs) | 0 | 16.7 | 33.3 | 50.0 | 66.7 | 83.3 | 100.0 | 116.7 | 133.3 | 150.0 | 166.7 |
| $F_4 =$ | Force exerted by Carrier Ring Drive Gear teeth on Differential Gear teeth (lbs) | 0 | 200 | 400 | 600 | 800 | 1000 | 1200 | 1400 | 1600 | 1800 | 2000 |
| $T_4 =$ | Torque transmitted to vehicle wheels via Differential Gear (Ft-lbs) | 0 | 100 | 200 | 300 | 400 | 500 | 600 | 700 | 800 | 900 | 1000 | in the opposite direction and thus driving vehicle 10 in the reverse direction. If switching the operating modes of the generator and electric motor 14 were to be initiated during forward vehicle motion, the reverse reaction force would act as a brake to bring vehicle 10 to a complete stop prior to reversing the direction of the vehicle's motion. While this is not intended as the primary method of braking the vehicle 10, it does provide a secondary braking mode in the event of primary braking mode failure. This method of drive wheel torque reversal never reaches a level at which to cause the wheels 12 to immediately spin in the opposite direction or cause the vehicle 10 to abruptly stop, and makes it easier and more efficient to rock the vehicle 10 back and forth when stuck.

Figure 6:
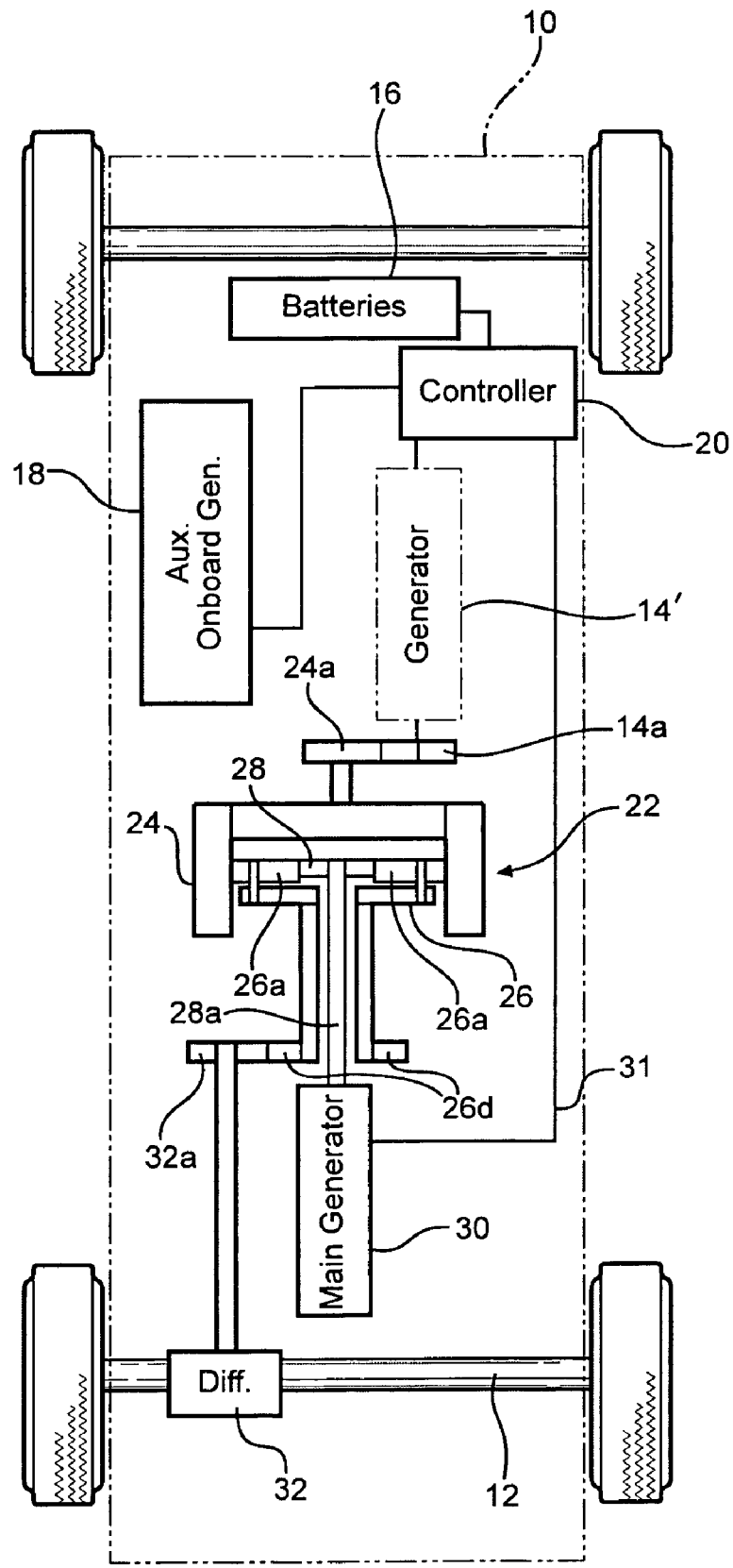
FIG. 6 is similar to FIG. 1, but shows the electric motor operating as a second generator, which is required for regenerative vehicle braking (primary vehicle braking mode).
Figure 6A:
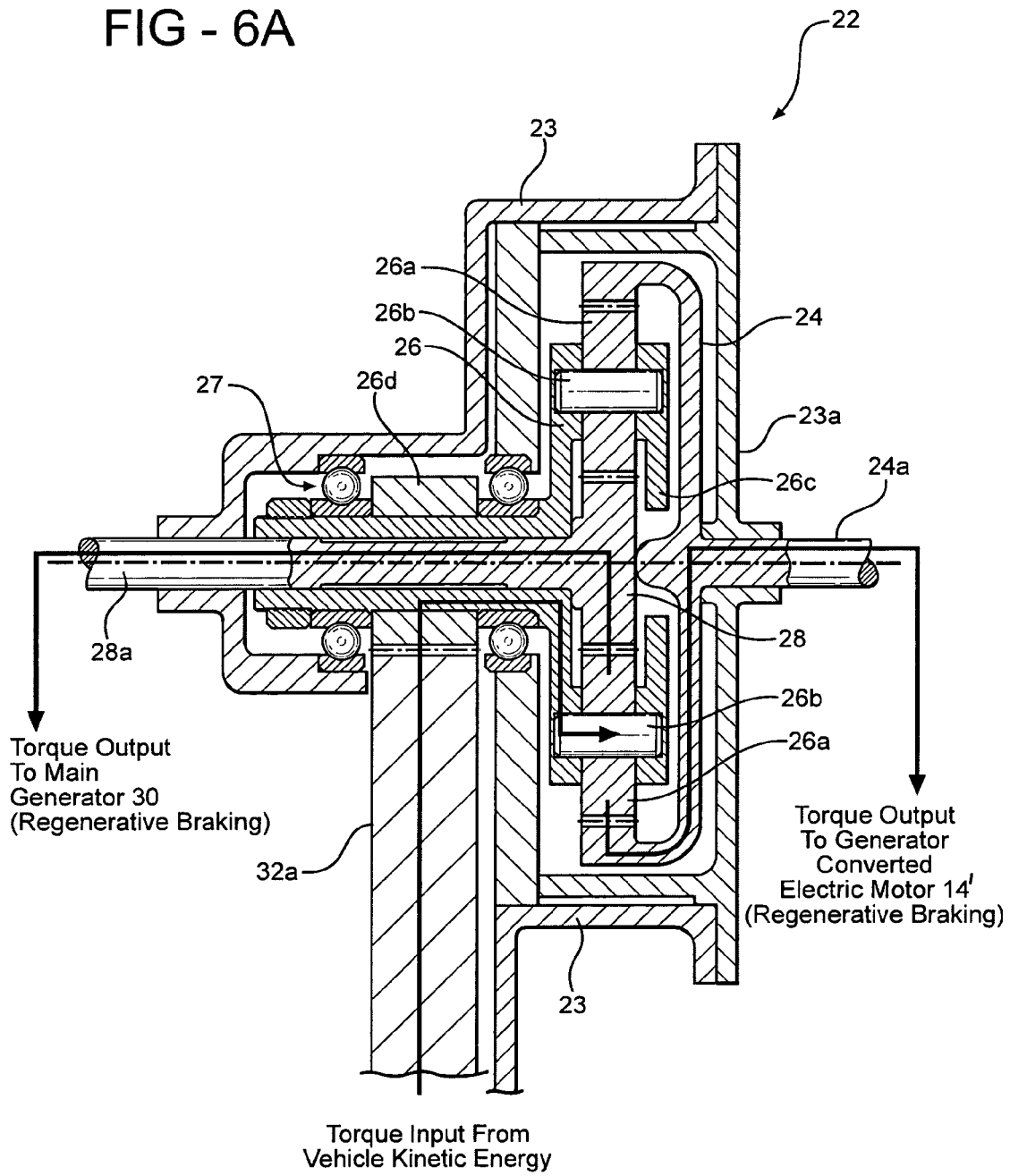
FIG. 6A is similar to FIG. 2, but shows the torque through the planetary gearing during regenerative braking (primary vehicle braking mode).

Referring next to FIGS. 6 and 6A, during vehicle braking, partial recovery of the vehicle's kinetic energy can be achieved by operating both the electric motor 14 and main generator 30 as generators while using conventional braking means (i.e., rotors and drums). In this primary vehicle braking mode, the vehicle's kinetic energy provides the torque to drive the two generators. This input torque is delivered to the generators through the carrier ring assembly 26 where it is used to provide the torque required to drive the two generators. The recovered energy could be used to operate other vehicle systems, to recharge the batteries 16, or both.

In the electric reaction drive of the present system, all the torque output from the electric motor 14 is used to drive the main generator 30, while the torque required to drive the vehicle 10 comes from the reaction forces in the system. Under prior hybrid systems, all of the torque output from the electric motor 14 goes to drive the vehicle 10, and the power to drive the generator comes from other sources (i.e., these prior systems never generate current unless the internal combustion engine is operating). For example, if under the presently illustrated system the amount of current generated by the main generator 30 equals one-half (this is a conservative estimate as efficiencies of generators of this type are believed to be closer to 85%) of the current required to drive the electric motor 14, then only 50% of the current required by the system would need to be provided by other sources (the auxiliary onboard generator 18 or on-board storage batteries 16). Under prior hybrid systems, 100% of the system current requirements must come from other sources since no generator-reactive forces are being used. The torque produced by the reactionary force in the present system, which is used to drive the vehicle 10, is believed to be greater than that which is delivered under prior hybrid systems for a given energy input, and in the example of FIGS. 1-6 above, the internal combustion engine could be one-half the size of those in prior hybrid or conventional systems. Some of the resulting benefits are reduced system non-recoverable energy, reduced vehicle weight, and reduced onboard storage battery requirements, all with what is believed to be similar or better vehicle performance than with prior hybrids and electrics.

It will be understood by those skilled in the art that while the electric reaction drive is illustrated for a front wheel drive passenger vehicle, other types of wheeled and non-wheeled vehicles and other mechanical systems having a rotatable drive component could be powered by the electric reaction drive. While rigid gear and shaft connections are illustrated as the torque or drive transfer mechanisms in the illustrated embodiment, other known means for transferring rotation torque to a drive mechanism could be used in certain parts of the system outside the planetary gear set, for example, drive belts or chains. It will also be understood that while a particular planetary gear assembly has been shown as an example, the planetary gearing may vary in its details. It will accordingly be understood that the disclosed embodiments are representative rather than definitive of the invention. The scope of the invention is defined by the following claims.

I accordingly claim:

1. An electric vehicle drive comprising:
an electric motor producing an action torque coupled to drive a main generator through a planetary gear set, the driving of the main generator producing an electrical output coupled to drive the electric motor and producing a reaction torque in the planetary gear set that is greater than the electric motor's action torque, the reaction torque being coupled through the planetary gear set to the vehicle wheels to drive the vehicle.

2. The electric vehicle drive of claim 1, further comprising an auxiliary onboard generator coupled to supply electric power to the electric motor.

3. The electric vehicle drive of claim 1, further comprising a battery coupled to supply electric power to the electric motor.

4. The electric vehicle drive of claim 3, further comprising an auxiliary onboard generator coupled to recharge the battery.

5. The electric vehicle drive of claim 4, wherein the auxiliary onboard generator comprises a combustion engine and an engine-driven generator.

6. The electric vehicle drive of claim 5, wherein the combustion engine is dedicated to drive the engine-driven generator.

7. The electric vehicle drive of claim 1, wherein the planetary gear set comprises a ring gear, a planetary carrier, and a sun gear, the electric motor's action torque is coupled to the ring gear, the sun gear is coupled to the main generator, and the carrier is coupled to the vehicle wheels.

8. The electric vehicle drive of claim 1, wherein the main generator is operable as an electric motor and the electric motor is operable as a regenerative main generator to produce a torque reversal to the drive wheels for vehicle reverse motion.

9. The electric vehicle drive of claim 8, wherein the method of torque reversal is capable of being used as a secondary method for vehicle braking in the event of primary braking mode failure, and also providing an easier and more efficient method of rocking the vehicle when stuck.

10. The electric vehicle drive of claim 1, wherein the electric motor is operable as a second generator during primary vehicle braking using conventional braking means, using the vehicles kinetic energy to drive both the generator converted electric motor and main generator to produce current for vehicle systems, charging the batteries, or both.

11. A method for driving a vehicle with an electric motor, comprising the steps of:
coupling an action torque output of the electric motor to drive a main generator through a planetary gear set, coupling an electrical output of the main generator to drive the electric motor, generating a reaction torque in the planetary gear set in response to the driving of the main generator, and coupling the reaction torque to a vehicle wheel to drive the vehicle.

12. The method of claim 11, further comprising the step of supplying electric power to the electric motor with a battery onboard the vehicle.

13. The method of claim 12, further comprising the step of supplying electric power to the electric motor with an auxiliary onboard generator.

14. The method of claim 13, further comprising the steps of supplying electric power to the electric motor with a battery onboard the vehicle, and of recharging the battery with the auxiliary onboard generator.

15. An electric drive for a rotatable drive mechanism, comprising:
a planetary gear set;
an electric motor mechanically connected to the planetary gear set for providing an input torque to the planetary gear set;
a main generator mechanically connected to the planetary gear set for receiving an output torque that is produced by the planetary gear set in response to the input torque, wherein the main generator is electrically connected to the electric motor for supplying electric power to the electric motor; and
the planetary gear set producing a reaction torque in response to the input torque,
wherein the reaction torque is greater than the input torque, and the planetary gear set is mechanically connected to the rotatable drive for transmitting the reaction torque to the rotatable drive from the planetary gear set.

16. The electric drive of claim 15, further comprising:
an auxiliary onboard generator electrically connected to the electric motor to supply electric power to the electric motor.

17. The electric drive of claim 16, further comprising:
a battery electrically connected to the electric motor to supply electric power to the electric motor; and
a controller electrically interposed between the electric motor and the main generator, the auxiliary onboard generator, and the battery to direct the flow of electric power.

18. The electric drive of claim 15, wherein the auxiliary onboard generator includes a combustion engine and an engine driven generator.

19. The electric drive of claim 18, wherein the combustion engine is dedicated to drive the engine-driven generator.

20. The electric drive of claim 15, further comprising:
the planetary gear set including a ring gear, a planetary carrier, and a sun gear,
wherein the electric motor is mechanically connected to the ring gear, the main generator is mechanically connected to the sun gear, and the rotatable drive mechanism is mechanically connected to the planetary carrier.

\* \* \* \* \*